(12) United States Patent
Chen et al.

(10) Patent No.: US 10,148,874 B1
(45) Date of Patent: Dec. 4, 2018

(54) METHOD AND SYSTEM FOR GENERATING PANORAMIC PHOTOGRAPHS AND VIDEOS

(71) Applicants: Scott Zhihao Chen, Irvine, CA (US); Weidong Cai, Foshan (CN); Qinghua Xu, Foshan (CN); Bozhong Wu, Foshan (CN); Peng Chen, Foshan (CN); Hu Luo, Foshan (CN)

(72) Inventors: Scott Zhihao Chen, Irvine, CA (US); Weidong Cai, Foshan (CN); Qinghua Xu, Foshan (CN); Bozhong Wu, Foshan (CN); Peng Chen, Foshan (CN); Hu Luo, Foshan (CN)

( * ) Notice: Subject to any disclaimer, the term of this patent is extended or adjusted under 35 U.S.C. 154(b) by 174 days.

(21) Appl. No.: 15/061,813

(22) Filed: Mar. 4, 2016

(51) Int. Cl.
*H04N 5/232* (2006.01)
*H04N 5/341* (2011.01)
*G06T 3/40* (2006.01)

(52) U.S. Cl.
CPC ....... *H04N 5/23238* (2013.01); *G06T 3/4038* (2013.01); *H04N 5/3415* (2013.01)

(58) Field of Classification Search
CPC . H04N 5/23238; H04N 5/3415; G06T 3/4038
See application file for complete search history.

(56) References Cited

U.S. PATENT DOCUMENTS

| | | | | |
|---|---|---|---|---|
| 6,788,333 B1 * | 9/2004 | Uyttendaele | ....... | H04N 5/23238 348/36 |
| 7,381,952 B2 * | 6/2008 | Teich | ............... | G08B 13/19641 250/330 |
| 8,106,936 B2 * | 1/2012 | Strzempko | ............ | G06T 3/4038 348/36 |
| 8,724,007 B2 * | 5/2014 | Chen | .................. | H04N 5/23238 348/345 |
| 9,007,432 B2 * | 4/2015 | Chuang | ............ | G08B 13/19619 348/39 |
| 9,635,252 B2 * | 4/2017 | Accardo | ............ | H04N 5/23238 |
| 9,652,856 B2 * | 5/2017 | Takenaka | ............... | G06T 3/4038 |
| 9,692,966 B2 * | 6/2017 | Hirata | ................ | H04N 5/23206 |
| 9,787,896 B2 * | 10/2017 | Fink | .................... | H04N 5/23206 |
| 9,811,946 B1 * | 11/2017 | Hung | .................... | G06T 19/006 |
| 2006/0023106 A1 * | 2/2006 | Yee | .................... | G02B 27/2228 348/335 |
| 2007/0024701 A1 * | 2/2007 | Prechtl | .................. | H04N 5/232 348/47 |

(Continued)

FOREIGN PATENT DOCUMENTS

CN 105120192 A * 12/2015

*Primary Examiner* — John Villecco

(57) ABSTRACT

A system and machine-implemented method of generating panoramic photographs and videos. Panoramic image data in a YUV data format is received in a YUV data format by an integrated circuit. A format of the panoramic image data is detected by the integrated circuit. The format includes resolution, pixel clock, line frequency information, and field frequency information. The panoramic image data is output, by the integrated circuit, to a memory unit. The panoramic image data is processed by the integrated circuit. The integrated circuit retrieves the panoramic image data from the memory unit. The processed panoramic image data is output, by the integrated circuit, to a processing unit. The processing includes at least one of projecting, stitching or distortion correcting.

12 Claims, 8 Drawing Sheets

(56) References Cited

U.S. PATENT DOCUMENTS

| | | | |
|---|---|---|---|
| 2010/0097443 A1* | 4/2010 | Lablans | G03B 37/00 348/36 |
| 2012/0229596 A1* | 9/2012 | Rose | G06T 3/4038 348/36 |
| 2013/0089301 A1* | 4/2013 | Ju | H04N 5/91 386/241 |
| 2014/0098185 A1* | 4/2014 | Davari | H04N 5/23238 348/36 |
| 2014/0270684 A1* | 9/2014 | Jayaram | H04N 5/23238 386/224 |
| 2015/0124049 A1* | 5/2015 | Kimura | G03B 37/00 348/39 |
| 2015/0138311 A1* | 5/2015 | Towndrow | H04N 5/23238 348/36 |
| 2016/0050369 A1* | 2/2016 | Takenaka | H04N 1/387 348/222.1 |
| 2016/0191795 A1* | 6/2016 | Han | G06T 3/4038 348/36 |
| 2016/0191889 A1* | 6/2016 | Son | H04N 13/0022 382/154 |
| 2016/0269607 A1* | 9/2016 | Nomura | H04N 5/243 |
| 2016/0286138 A1* | 9/2016 | Kim | H04N 5/23238 |
| 2017/0070553 A1* | 3/2017 | Mayrand | H04L 65/601 |
| 2017/0195568 A1* | 7/2017 | Leizerovich, Jr. | H04N 5/23238 |
| 2017/0236162 A1* | 8/2017 | Christensen | G06Q 30/0269 705/14.66 |

\* cited by examiner

METHOD AND SYSTEM FOR GENERATING PANORAMIC PHOTOGRAPHS AND VIDEOS

BACKGROUND

The present disclosure relates to the field of panoramic imaging systems, and more particularly to a system and related methods for generating panoramic photographs and videos.

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Panoramic imaging solutions may include a traditional video recording and broadcasting system which requires video capturing, producing, broadcasting and/or other steps to achieve video recording and broadcasting, which takes a long time. A video recording and broadcasting equipment may only record video from a predefined angle. To acquire a panoramic video, the video recording and broadcasting equipment may be rotated to capture video from a different angle. In some aspects, multiple video recording equipment may capture video from different angles simultaneously and record simultaneously to provide for imaging stitching during an image post-processing by a computer.

Currently, panoramic imaging solutions may include the use of a multi-camera panoramic system for simultaneous imaging or video capturing. The multi-camera panoramic system may be bulky and not portable. In addition, the panoramic image or video captured by multi-camera panoramic systems may be processed by a computer and may not be an instant and real-time presentation to a user.

SUMMARY

The disclosed subject matter relates to a machine-implemented method. The method comprises receiving, by an integrated circuit, panoramic image data in a YUV data format. The method further comprises detecting, by the integrated circuit, a format of the panoramic image data, wherein the format including resolution, pixel clock, line frequency information, and field frequency information. The method further comprises outputting, by the integrated circuit, the panoramic image data to a memory unit. The method further comprises processing, by the integrated circuit, the panoramic image data, wherein the integrated circuit retrieves the panoramic image data from the memory unit. In addition, the method comprises outputting, by the integrated circuit, the processed panoramic image data to a processing unit, wherein the processing includes at least one of projecting, stitching or distortion correcting.

The disclosed subject matter also relates to system. The system comprises a plurality of digital cameras having a field of view that overlaps with the field of view of at least one other camera among the plurality of digital cameras. The system further comprises a controller commanding each digital camera among the plurality of digital cameras to acquire panoramic image data. In addition, the system comprises a processor unit. The processing unit comprises a receiving module for receiving the panoramic image data in a YUV data format. The processing unit further comprises a detection module for detecting a format of the panoramic image data, wherein the format including resolution, pixel clock, line frequency information, and field frequency information. The processing unit further comprises a first input module for inputting the panoramic image data to a memory unit. The processing unit further comprises a processing module for processing the panoramic image data. In addition, the processing unit further comprises an output module for outputting the processed panoramic image data to a processing unit, wherein the processing includes at least one of projecting, stitching or distortion correcting.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Provided herein are systems and methods for acquiring, creating and presenting panoramas, including still images and movies. According to one aspect of the present disclosure, a panoramic imaging system is provided. The panoramic imaging system according to the present disclosure includes at least an optical system, an image processing algorithm and a control system. Particularly, the optical system includes a set of cameras and is capable of capturing image information from a wide to ultra-wide field of view with high resolution, quality and visual reality. The image processing algorithm is capable of instantly processing image inputs by the set of cameras into continuous and seamless panoramas for real-time presentation. Finally, the control system takes commands from an end user and controls the system to perform various functions. The present system and methods integrate image acquisition, image processing, instant and real-time panoramic presentation, mobile application, wireless data communication, cloud computing, remote storage and other external services.

Figure 1:
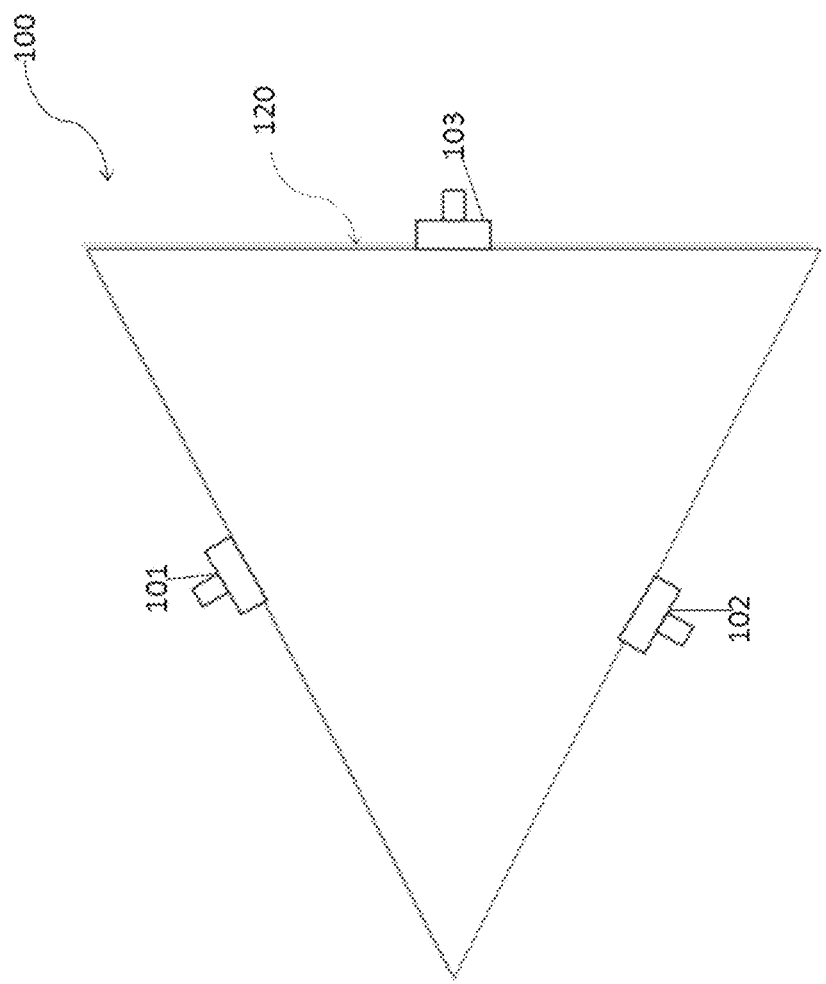
FIG. 1 is a schematic top view of an example panoramic imaging system according to certain aspects of the disclosure.

FIG. 1 is a schematic top view of an example panoramic imaging system according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes cameras 101, 102, and 103, a control system (not shown) and housing 120. Each of cameras 101, 102, and 103 may be a digital camera. In some aspects, each of cameras 101, 102, and 103 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101, 102, and 103 are distributed evenly across on a frame of housing 120, for example, on three vertices of the frame with a triangle shape. Each of cameras 101, 102, and 103 may face a ⅓ of a 360° field. It can be appreciated that cameras 101, 102, and 103 may be distributed in any other arrangement and each of cameras 101, 102, and 103 may face any portion of a 360° field.

The control system may include one or more electronic circuitries, such as a system on chip (SOC) with A field-programmable gate array (FPGA), Accelerated Processing Unit (APU) and peripheral electronic circuitries, for processing the image data captured by cameras 101, 102 and 103 to produce wide to entire 360° panoramas, including both still images and movies. It can now be appreciated that outputs of panoramic imaging system 100 may be panoramas stitched from a set of original images captured by cameras 101, 102, and 103.

Cameras 101, 102, and 103 and the control system may be enclosed in housing 120, such as a protective housing to reduce environmental effects on the components. In some embodiments, the protective housing is waterproof, dust-proof, shockproof, freeze-proof, or any combination thereof.

In some aspects, housing 120 may include one or more mechanical parts for mounting, housing and/or moving the cameras 101, 102, and 103 and/or other optical components. Further, in some embodiments, cameras 101, 102, and 103 can be reversibly coupled to or detached from the remaining system, such that an end user may select different models of cameras 101, 102, and 103 to be used with panoramic imaging system 100 according to particular needs or preferences.

It can be now appreciated that a variety of embodiments of cameras 101, 102, and 103 may be employed. These embodiments may have different numbers and/or arrangements of cameras 101, 102, and 103, but a common feature may be that each camera's field of view overlaps with that of at least one other camera, thereby enabling panoramic imaging system 100 to capture a total field of view according to the design. Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
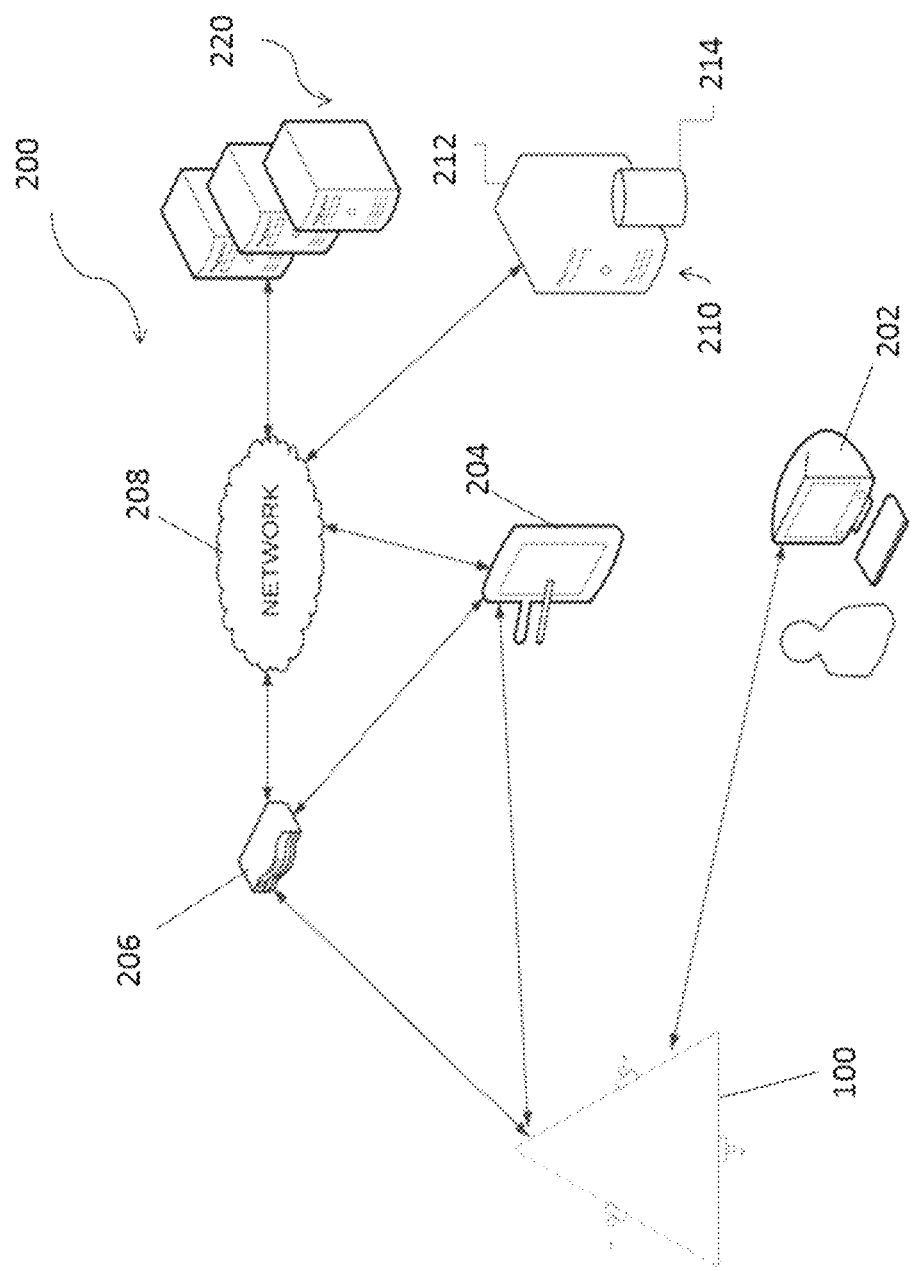
FIG. 2 illustrates an example network environment which provides for capturing and processing panoramic photographs and videos.

FIG. 2 illustrates an example network environment which provides for capturing and processing panoramic photographs and videos. Not all of the depicted components may be used, however, and one or more implementations may include additional components not shown in the figure. Variations in the arrangement and type of the components may be made without departing from the scope of the subject technology. Additional components, different components, or fewer components may be provided.

Network environment 200 includes panoramic imaging system 100, computing devices 202 and 204 communicably connected to servers 210 and 220 via network 208. Computing devices 202 and 204 may access network 208 via wireless access point 206.

Each of computing devices 202 and 204 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 202 and 204 may be provided access to or receive application software executed or stored on any of other computing devices 202 and 204.

Server 210 can include computing device 212 and computer-readable storage device 214 (e.g., data stores). Each of servers 210 and 220 may be a system or device having a processor, a memory, and communications capability for providing content and/or services to the computing devices. In some example aspects, each of servers 210 and 220 can be a single computing device, for example, a computer server. In other embodiments, each of servers 210 and 220 can represent more than one computing device working together to perform the actions of a server computer (e.g., cloud computing). Further, each of servers 210 and 220 can represent various forms of servers including, but not limited to an application server, a proxy server, a network server, an authentication server, an electronic messaging server, a content server, a server farm, etc., accessible to computing devices 202 and 204. For example, server 210 may be a web server that delivers web content accessible through network 208.

A user may interact with the content and/or services provided by servers 210 and 220, through a client application installed at computing devices 202 and 204. Alternatively, the user may interact with the system through a web browser application at computing devices 202 and 204. Communication between computing devices 202 and 204 and servers 210 and 220 may be facilitated through network 208.

In some aspects, computing devices 202 and 204 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

As described above with reference to FIG. 1, panoramic imaging system 100 of FIG. 1 includes cameras 101, 102, and 103, a control system and housing 120. In some aspects, panoramic imaging system 100 may be a handheld device with 360-degree panorama real-time recording and broadcasting capabilities. Panoramic imaging system 100 may be used to capture horizontal 360-degree panoramic image data within a front, rear, left and right direction of panoramic imaging system 100 and achieve real-time broadcasting and sharing of the image data. Panoramic imaging system 100 of may generate 360-degree panoramic image data by imaging stitching and construction, and send to computing devices 202 and 204 via a wireless communication method, and/or store the encoded image data locally on panoramic imaging system 100, for example, on a Secure Digital (SD) Card.

In some aspects, panoramic imaging system 100 may send the generated 360-degree panoramic image data to computing device 204, for example, including a smartphone, for live broadcast via a wireless communication method. In some aspects, panoramic imaging system 100 may send the generated 360-degree panoramic image data to the cloud via wireless access point 206 to achieve cloud data storage and sharing. 360-degree panoramic image data in the cloud can be broadcast in computing device 204, such as smart devices and/or a web end device. In some aspects, panoramic imaging system 100 may send the 360-degree panoramic image data to computing device 202 for storage and playback via Universal Serial Bus (USB) 3.0 standard. In some aspects, panoramic imaging system 100 may send the 360-degree panoramic image data to computing device 202 for playback via a High-Definition Multimedia Interface (HDMI). In some aspects, panoramic imaging system 100 may store the encoded 360-degree panoramic image data in a SD Card on panoramic imaging system 100.

Figure 3:
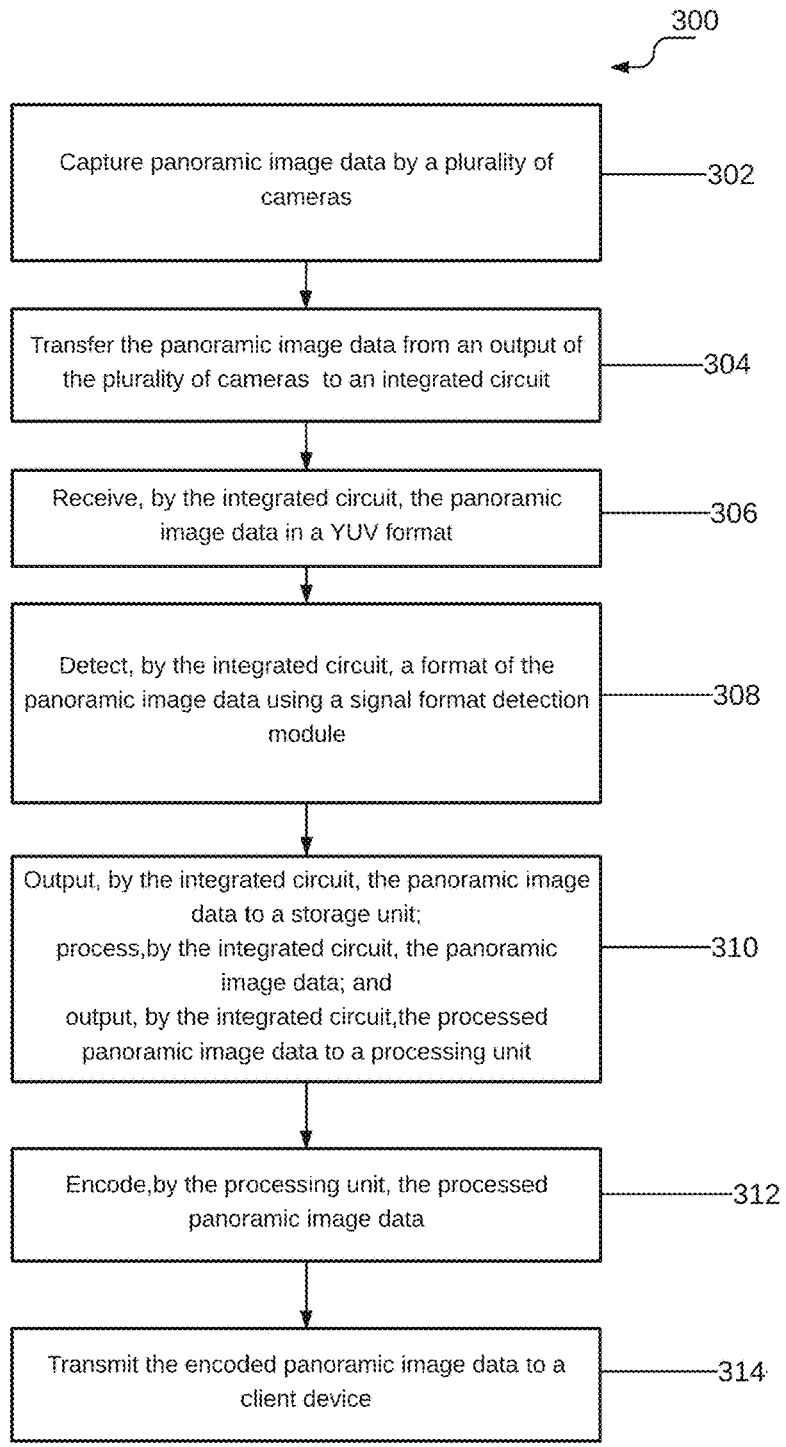
FIG. 3 illustrates a flow diagram of an example process for generating panoramic photographs and videos according to one embodiment of the present disclosure.

FIG. 3 illustrates a flow diagram of an example process for generating panoramic photographs and videos according to one embodiment of the present disclosure. For explanatory purposes, the example process 300 is primarily described herein with reference to panoramic imaging system 100 of FIG. 1; however, the example process 300 is not limited to the panoramic imaging system 100 of FIG. 1, and the example process 300 may be performed by one or more components of panoramic imaging system 100 of FIG. 1. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

At step 302, panoramic imaging system 100 captures panoramic image data by a plurality of cameras. In some aspects, panoramic image data may include 360-degree panoramic image data.

In some aspects, a horizontal angle of view of each of the plurality of cameras capturing the 360-degree panoramic image data is 360 degrees divided by the number of the plurality of cameras (e.g., N) and a vertical angle of view of each of the plurality of cameras capturing the 360-degree panoramic image data is 360 degree divided by the number of the plurality of cameras. In some aspects, when N>6, each of the plurality of cameras may include a wide-angle lens; when N>8, each of the plurality of cameras may include a regular (e.g., narrow-angle) lens; and when N<=6, each of the plurality of cameras may include a fisheye lens.

In some aspects, when N=>8, each of the plurality of cameras may include a regular (e.g., narrow-angle) lens to capture an image without no distortion, therefore distortion correction may not be required. In some aspects, when N<=8, each of the plurality of cameras may include a fisheye lens, and distortion may exist in the captured image, therefore distortion correction may be required.

At step 304, panoramic imaging system 100 transfers the panoramic image data from an output of the plurality of cameras to an integrated circuit on panoramic imaging system 100, such as a field-programmable gate array (FPGA). In some aspects, the panoramic image data is transmitted through a parallel YUV data interface to the FPGA. In some aspects, the panoramic image data is transmitted through a Mobile Industry Processor Interface (MIPI) data interface and outputted to the FPGA through an interface chip converting a MIPI data format to a parallel YUV data format.

At step 306, panoramic imaging system 100 receives, by the integrated circuit, the panoramic image data in a YUV format. In some aspects, luminance values and chrominance values for a group of one or more pixels in the image data may be referred to in the art as YUV format.

At step 308, panoramic imaging system 100 detects, by the integrated circuit, a format of the panoramic image data using a signal format detection module. The format of the image data may include resolution, pixel clock, line frequency information, and/or field frequency information.

At step 310, panoramic imaging system 100 outputs, by the integrated circuit, the panoramic image data to a storage unit. Panoramic imaging system 100 processes, by the integrated circuit, the panoramic image data. Panoramic imaging system 100 outputs the processed panoramic image data to a processing unit. Processing the image data includes projection and image stitching, and/or distortion correction. In some aspects, the image data after processing may include 360-degree panoramic image data. The image data before processing, for example, before image stitching, may be part of the panoramic image data.

In some aspects, by receiving YUV formatted input image data and through format detection module to detect the signal format of the image data, including resolution, pixel clock, line frequency information and/or field frequency information, the detected image data may be outputted to a double data rate (DDR) memory unit. The detected image data may be processed, and the processed image data may be sent to a processing unit for processing. The processing may include projection and image stitching, or distortion correction to produce 360-degree panoramic image and/or video.

At step 312, panoramic imaging system 100 encodes, by the processing unit, the processed panoramic image data. In some aspects, panoramic imaging system 100 encodes, by the processing unit, the processed panoramic image data using H.264 standard.

At step 314, panoramic imaging system 100 transmits the encoded panoramic image data to a client device. In some aspects, the encoded panoramic image data is transmitted to a client device via a wireless network to a client device. In some aspects, the encoded panoramic image data is transmitted to a client device via a wired network to a client device, such as a mobile terminal. In some aspects, the encoded panoramic image data is stored on a SD card in panoramic imaging system 100. In some aspects, the encoded panoramic image data is sent to a wireless access point and a smart device through a wireless network. In some aspects, the encoded panoramic image data is output to the smart device via a communication interface such as a HDMI, or output to mobile a terminals via a communication protocol such as USB.

Figure 4:
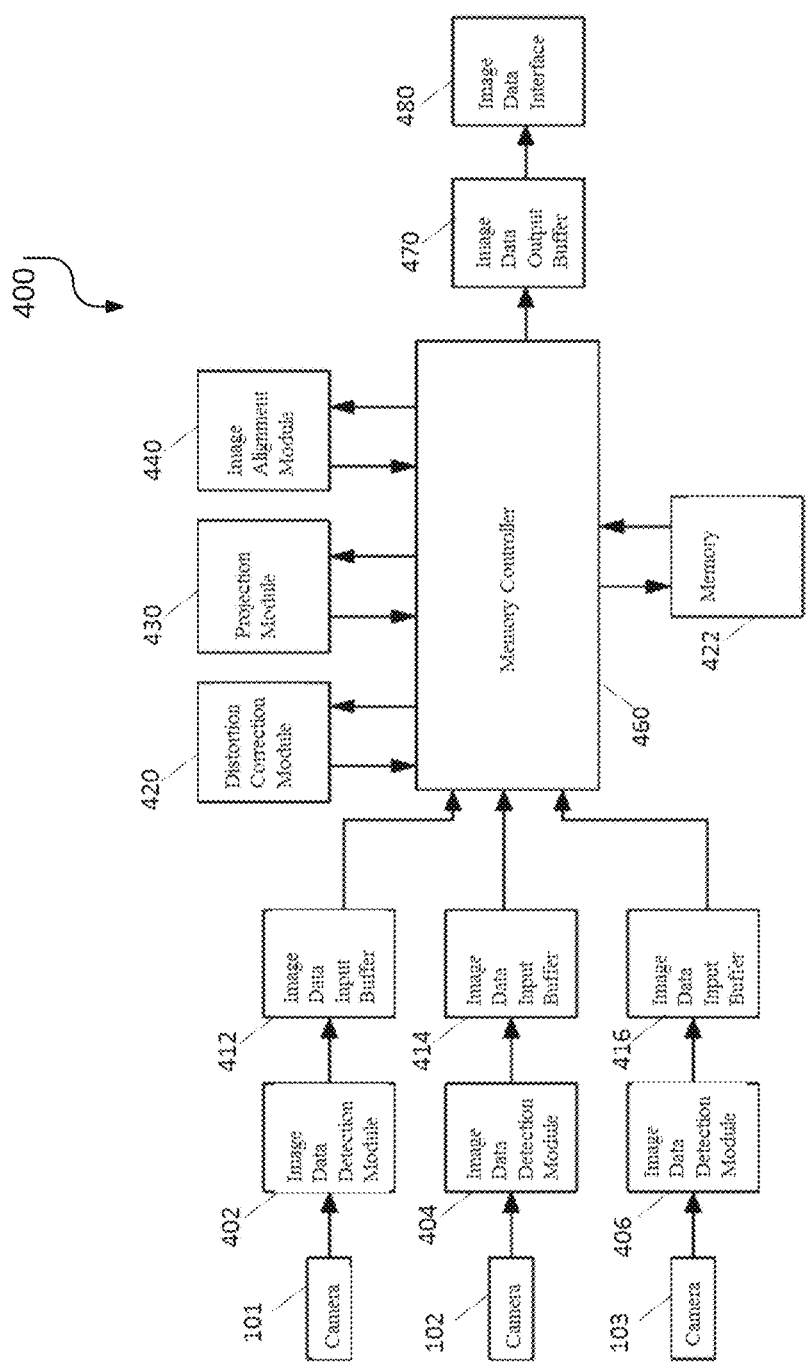
FIG. 4 illustrates a block diagram of an example panoramic imaging system according to certain aspects of the disclosure.

FIG. 4 illustrates a block diagram of panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 4, panoramic imaging system 100 includes cameras 101, 102 and 103, image data detection module 402, 404, and 406, image data input buffer 412, 414, and 416, distortion correction module 420, memory 422, projection module 430, image alignment module 440, memory controller 460, image data output buffer 470, and image data interface 480.

Image data detection module 402, 404, and 406 may detect the format of the image data may include resolution, pixel clock, line frequency information, and/or field frequency information.

Image data input buffer 412, 414, and 416 may input the image data to memory controller 460. Memory controller 460 may be a digital circuit that manages the flow of data going to and from memory 422. Memory controller 460 can be a separate chip or integrated into another chip, such as being placed on the same die or as an integral part of a microprocessor. Memory 422 may include double data rate synchronous dynamic random-access memory (DDR SDRAM).

As described above with reference to FIG. 3, when the number of the plurality of cameras N<=8, each of the plurality of cameras may include a fisheye lens, and distortion may exist in the captured image, therefore distortion correction may be required. Distortion correction module 420 may include instructions or algorithms to perform one or more distortion corrections.

Memory controller 460 may be communicate with distortion correction module 420, projection module 430, image alignment module 440, and memory 422 to process image data captured by cameras 101, 102, and 103. Projection module 430 may perform a coordinate transformation of image data, such as cylindrical projection, equirectangular projection. Image alignment module 430 may align one or more images captured by cameras 101, 102, and 103 to process the image data to generate a panoramic image.

Image data output buffer 470 may output the processed image data to image data output buffer 470.

Figure 5:
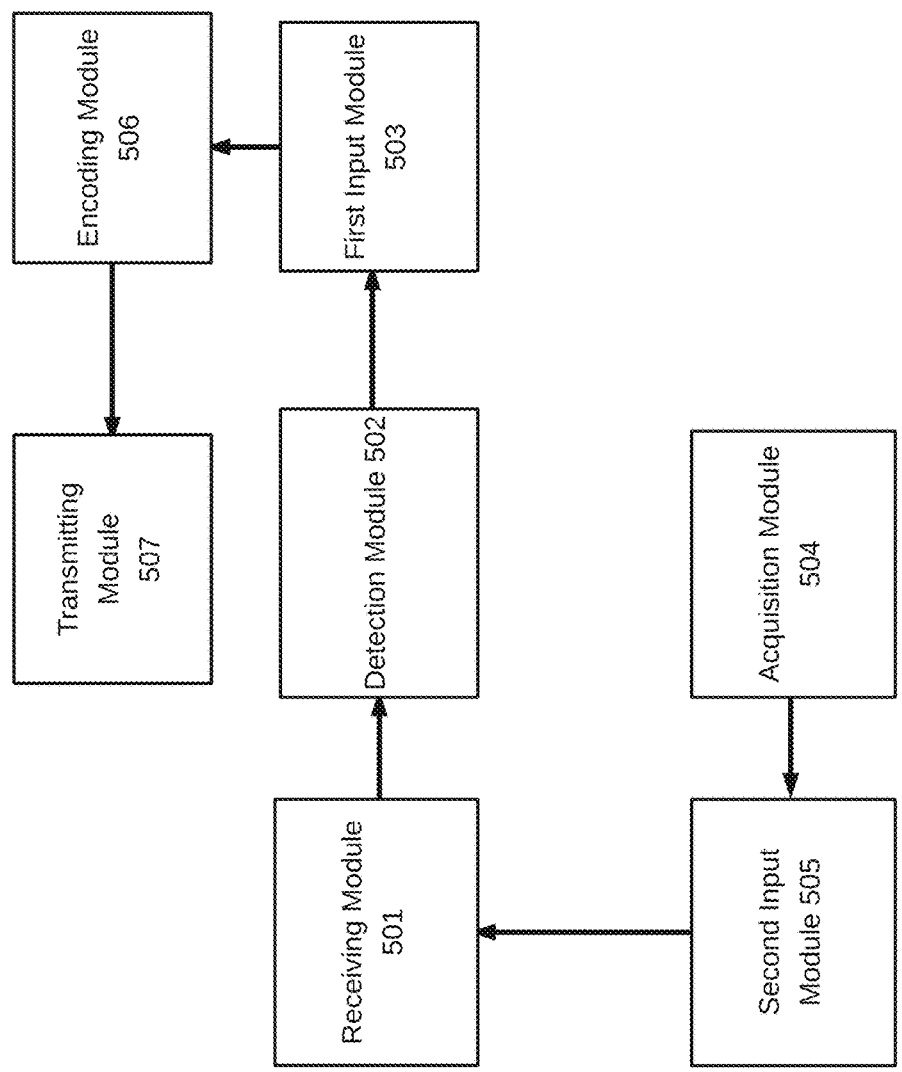
FIG. 5 illustrates a block diagram of an example panoramic imaging system according to certain aspects of the disclosure.

FIG. 5 illustrates a block diagram of panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 5, panoramic imaging system 100 includes receiving module 501, detection module 502, first input module 503, acquisition module 504, second input module 505, encoding module 506, and transmitting module 507.

Receiving module 501 may receive image data in a YUV format. Detection module 502 may detect a signal format of the image data. The signal format of the image data may include resolution, pixel clock, line frequency information, and/or field frequency information. First input module 503 may output the detected image data to a DDR memory unit. The detected image data may be processed at first input module 503, and the processed image data may be sent to a processing unit for processing. The processing may include projection and image stitching, or distortion correction to produce 360-degree panoramic image and/or video.

Acquisition module 504 may capture panoramic image data, such as 360-degree panoramic image data, by a plurality of cameras. In some aspects, a horizontal angle of view of each of the plurality of cameras capturing the 360-degree panoramic image data is 360 degrees divided by the number of the plurality of cameras (e.g., N) and a vertical angle of view of each of the plurality of cameras capturing the 360-degree panoramic image data is 360 degree divided by the number of the plurality of cameras.

In some aspects, when N>6, each of the plurality of cameras may include a wide-angle lens; when N>8, each of the plurality of cameras may include a regular (e.g., narrow-angle) lens; and when N<=6, each of the plurality of cameras may include a fisheye lens. In some aspects, when N=>8, each of the plurality of cameras may include a regular (e.g., narrow-angle) lens to capture an image without no distortion, therefore distortion correction may not be required. In some aspects, when N<=8, each of the plurality of cameras may include a fisheye lens, and distortion may exist in the captured image, therefore distortion correction may be required.

Second input module 505 may output the 360-degree panoramic image data to a FPGA. Encoding module 506 may encode the 360-degree panoramic image data via a processing unit using H.264 standard. Transmitting module 507 may transmit the processed image data to a client device.

Figure 6:
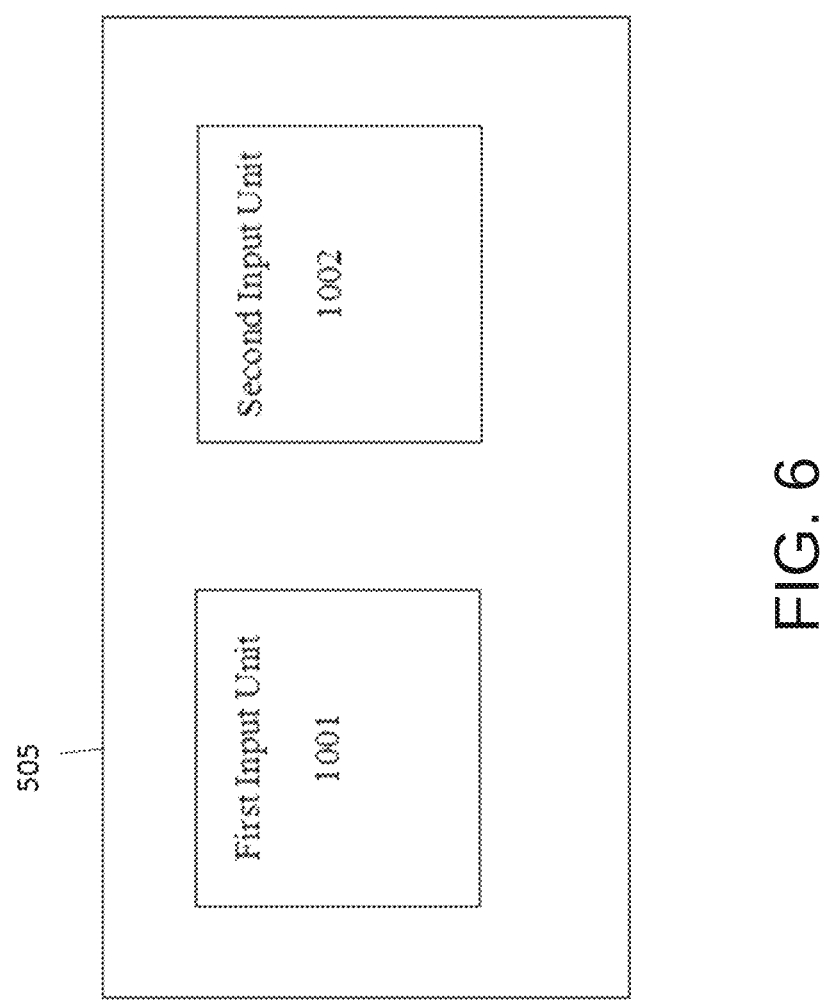
FIG. 6 illustrates a block diagram of an example second input module according to certain aspects of the disclosure.

FIG. 6 illustrates a block diagram of second input module 505 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 6, second input module 505 includes first input unit 1001, and second input unit 1002. In some aspects, first input unit 1001 may transmit the 360-degree panoramic image data through a parallel YUV data interface to the FPGA. In some aspects, second input unit 1002 may transmit the 360-degree panoramic image data through a MIPI data interface and output to the FPGA through an interface chip converting a MIPI data format to a parallel YUV data format.

Figure 7:
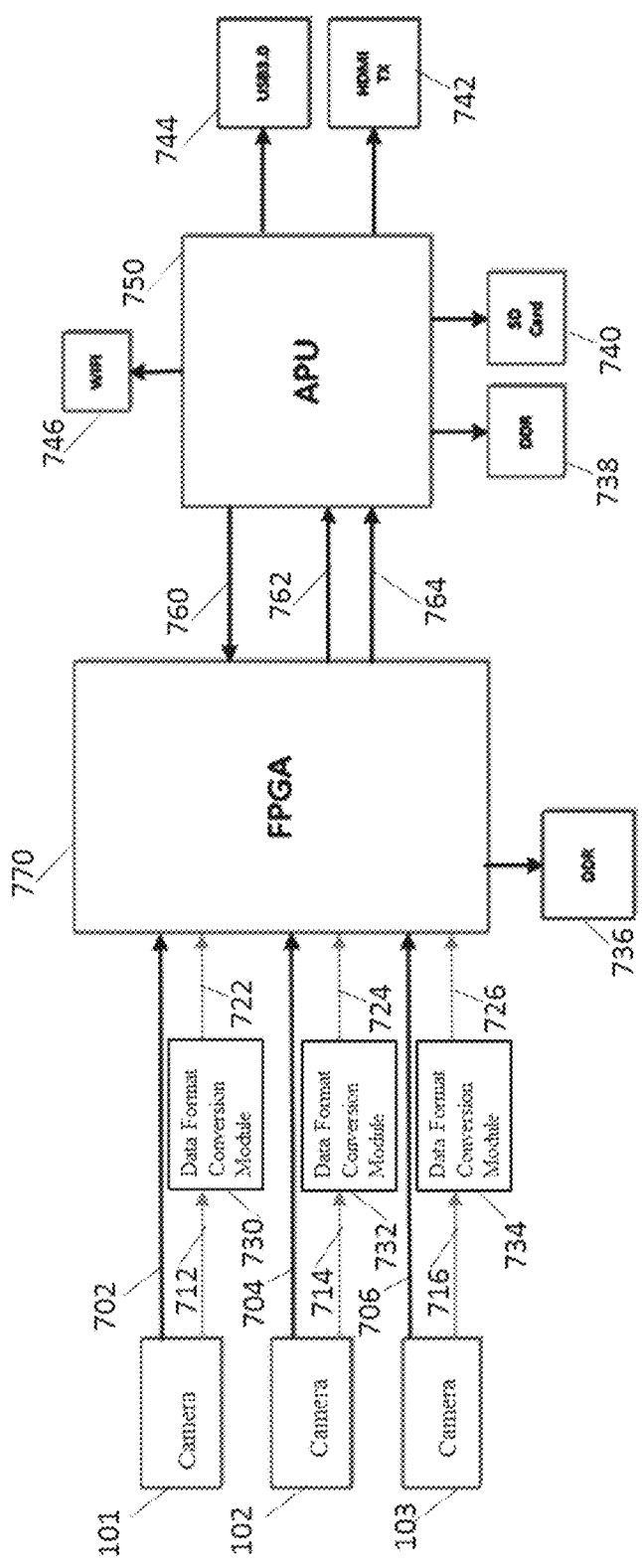
FIG. 7 illustrates a block diagram of an example panoramic imaging system according to certain aspects of the disclosure.

FIG. 7 illustrates a block diagram of panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 7, panoramic imaging system 100 includes cameras 101, 102, and 103, FPGA 770, APU 750, DDR 736 and 738, SD card 740, WIFI module 746, USB3.0 module 744, and HDMI TX module 742.

In one or more implementations, one or more of cameras 101, 102, and 103 may simultaneously establish connections with FPGA 770. In some aspects, camera 101 may establish a connection 702 with FPGA 770. Alternatively, camera 101 may establish a connection 712 with data conversion module 730 and data conversion module 730 may establish a connection 722 with FPGA 770. In some aspects, camera 102 may establish a connection 704 with FPGA 770. Alternatively, camera 102 may establish a connection 714 with data conversion module 732 and data conversion module 732 may establish a connection 724 with FPGA 770. In some aspects, camera 103 may establish a connection 706 with FPGA 770. Alternatively, camera 103 may establish a connection 716 with data conversion module 734 and data conversion module 734 may establish a connection 726 with FPGA 770. Connection 702, 704, and 706 may include parallel YUV data connection. Connection 722, 724, and 726 may include parallel YUV data connection. Connection 712, 714, and 716 may include MIPI data connection. Data conversion module 730, 732, and 734 may convert data format from MIPI data format to parallel YUV data format.

In some implementations, FPGA 700 may execute instructions that are stored on FPGA 700 itself, such as one or more integrated circuits. While the above discussion primarily refers to FPGA 700 that executes instructions, some implementations are performed by one or more integrated circuits, for example, application specific integrated circuits (ASICs). In some aspects, some implementations may be performed by one or more processors that executes instructions.

APU 750 may establish a connection 760 with FPGA 700. Connection 760 may include an I2C connection, to allow easy communication between components which reside on the same circuit board. FPGA 700 may establish a connection 762 and 764 with APU 750. Connection 762 and 764 may include one or more video data connection.

Figure 8:
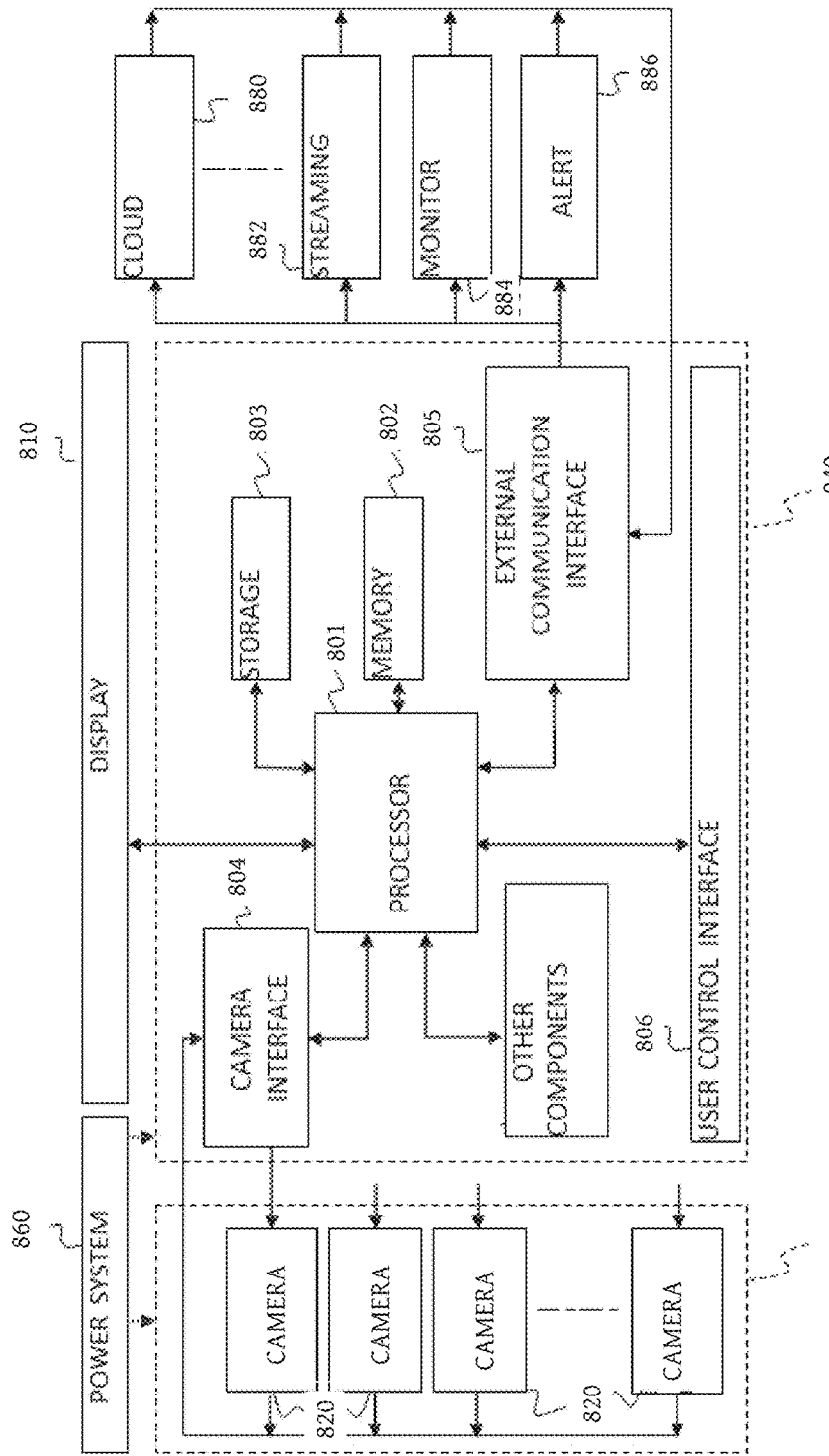
FIG. 8 conceptually illustrates an example electronic system with which some implementations of the subject technology can be implemented.

FIG. 8 conceptually illustrates an example electronic system 800 with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system may include an example panoramic imaging system, such as panoramic imaging system 100 as described above with reference to FIGS. 1, 2, 4 and 7. According to the present disclosure, the example panoramic imaging system includes a control system that controls the functions of the optical system 822 and at least an image processing algorithm. Particularly, the control system 840 includes at least a processor 801, a memory 802, a storage device 803, a camera interface 804, an external communication interface 805, and a user control interface 806. The control system 840 can be a general-purpose computer system such as a Personal Computer (PC), or preferably a custom-designed computing system. Particularly in some embodiments, the control system 840 is a system on chip (SOC); that is, an integrated circuit (IC) integrates all components and functions of the control system 840 into a single chip, which makes the present panoramic imaging system portable and electronically durable as a mobile device. In some embodiments, the control system 840 may be located internally within a same housing where the optical system 822 is located. Alternatively, in other embodiments, the control system 840 is separated from the optical system 822 to allow end users' selection of different models of an optical system 822 to be used with the control system 840.

The storage device 803 is preloaded with at least the image processing algorithm of the present disclosure. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 801 carries out instructions of the various algorithms. Thus, the various software programs, stored on the storage device 803 and executed in the memory 802 by the processor 801, direct the control system 840 to act in conjunction with the optical system 822 to perform various functions, which include but are not limited to receiving commands from an end user or an external device or service 801, defining the precise geometry of the cameras 820, commanding the cameras 820 to capture raw image data, tagging and storing raw data in a local storage device 803 and/or commuting raw data to an external device or service 801, processing raw data to create panoramic images or videos according to commands received, presenting generated panoramas on a local display 810 and/or communicating generated panoramas to be stored or presented on an external device or service 880, 882, 884 and 886.

The processor 801 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 840 may employ a multi-core processor that has two or more CPUs or array processors that have multiple processors operating in parallel. In some embodiments, the processor 801 is an application specific integrated circuit (ASIC) that is designed for a particular use rather than for general purpose use. Particularly, in some embodiments, the processor 801 is a digital signal processor (DSP) designed for digital signal processing. More particularly, in some embodiments, the processor 801 is an on-chip image processor, specialized for image processing in a portable camera system. In some embodiments, the control system 840 includes a graphic processing unit (GPU), which has a massively parallel architecture consisting of thousands of smaller, more efficient cores designed for handling multiple tasks simultaneously. Particularly, in some embodiments, the control system 840 may implement GPU-accelerated computing, which offloads compute-intensive portions of an algorithm to the GPU while keeping the remainder of the algorithm to run on the CPU.

The memory 802 and the storage 803 of the present disclosure can be any type of primary or secondary memory device compatible with the industry standard, such as ROM, RAM, EEPROM, flash memory. In the embodiments where the control system 840 is a single chip system, the memory 802 and storage 803 blocks are also integrated on-chip with the processor 801 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for generating panoramic photographs and videos. From these various memory units, the processor 801 retrieves instructions to execute and data to process in order to execute the processes of some implementations.

The camera interface 804 of the present disclosure can be any form of command and data interface usable with a camera 820, such as a digital camera. Exemplary embodiments include USB, FireWire and any other interface for command and data transfer that may be commercially available. Additionally, it is preferred, although not required, that the optical system 822 be equipped with a single digital control line that would allow a single digital signal to command all the cameras 820 simultaneously to capture an image of a scene.

The external communication interface 805 of the present disclosure can be any data communication interface, and may employ a wired, fiber-optic, wireless, or another method for connection with an external device or service 880, 882, 884 and 886. Ethernet, wireless-Ethernet, Bluetooth, USB, FireWire, USART, SPI are exemplary industry standards. In some embodiments, where the control system 840 is a single chip system, the external communication interface 805 is integrated on-chip with the processor 801 as well as other peripherals and interfaces.

The user control interface 806 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

The control system 840 of the present disclosure may further include other components that facilitate its function. For example, the control system 840 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. The control system 840 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. The control system 840 may optionally be equipped with a light sensor for environmental light conditions, so that the control system 840 can automatically adjust hardware and/or software parameters of the system.

In some embodiments, the present panoramic imaging system is further equipped with an internal power system 860 such as a battery or solar panel that supplies the electrical power. In other embodiments, the panoramic imaging system is supported by an external power source. In some embodiments, the panoramic imaging system is further equipped with a display 810, such that panoramic photos may be presented to a user instantly after image capture, and panoramic videos may be displayed to a user in real time as the scenes are being filmed.

In some embodiments, the present panoramic imaging system may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 880, online video streaming 882 and file sharing 882, remote surveillance 884, and alert 886 for home and public security.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method of generating panoramic photographs and videos, comprising:
   receiving, by an integrated circuit (IC) chip, panoramic image data in a YUV data format, wherein the panoramic image data comprises at least a part of 360-degree panoramic image data;
   outputting, by the IC chip, the panoramic image data to a memory unit;
   retrieving, by the IC chip, the panoramic image data from the memory unit;
   processing, by the IC chip, the panoramic image data, wherein the processing includes at least one of projecting, stitching or distortion correcting; and
   outputting, by the IC chip, the processed panoramic image data to a processor coupled to the IC chip.

2. The method of claim 1, further comprising:
   acquiring the 360-degree panoramic image data by N cameras, wherein N is greater than or equal to 1, the horizontal angle of view of each camera is 360°/N and the vertical angle of view of each camera is 360°/N; and
   outputting the acquired 360-degree panoramic image data to the IC chip.

3. The method of claim 2, further comprising:
   transmitting the 360-degree panoramic image data through a parallel YUV image data interface to the IC chip.

4. The method of claim 1, further comprising:
   encoding, by the processor, the processed panoramic image data using H.264 standard to generate encoded panoramic image data.

5. The method of claim 4, further comprising:
   transmitting, by the processor, the encoded panoramic image data to a mobile terminal by at least one of a wireless communication method, or a wired communication method.

6. The method of claim 4, further comprising at least one of:
   storing the encoded panoramic image data to a local SD card;
   sending the encoded panoramic image data to a wireless access point and a smart device through WIFI;
   outputting the encoded panoramic image data to a smart device via HDMI; and
   outputting the encoded panoramic image data to a mobile terminal via USB.

7. A system for generating panoramic photographs and videos, comprising:
   a plurality of cameras;
   an integrated circuit (IC) chip coupled to the plurality of cameras;
   wherein the IC chip is configured to:
   receive panoramic image data in a YUV data format, the panoramic image data comprising at least a part of 360-degree panoramic image data;
   output the panoramic image data to a memory unit;
   retrieve the panoramic image data from the memory unit; and
   process the panoramic image data including at least one of projecting, stitching or distortion correcting; and
   a processor coupled to the IC chip and configured to receive the processed panoramic image data.

8. The system of claim 7,
   wherein the plurality of cameras are configured to acquire 360-degree panoramic image data by N cameras, wherein N is greater than or equal to 1, the horizontal angle of view of each camera is 360°/N and the vertical angle of view of each camera is 360°/N.

9. The system of claim 8,
   wherein the processor is further configured to input the 360-degree panoramic image data to the IC chip via a parallel YUV data interface.

10. The system of claim 7, wherein the processor is configured to encode the panoramic image data using H.264 standard.

11. The system of claim 10,
   wherein the processor is further configured to transmit the encoded panoramic image data to a mobile terminal by at least one of a wireless communication method, or a wired communication method.

12. The system of claim 11, wherein the processor is further configured to store the encoded panoramic image data to a local SD card, send the encoded panoramic image data to a wireless access point and a smart device through WIFI, output the encoded panoramic image data to a smart device via the HDMI, or output the encoded panoramic image data to a mobile terminal via USB.

* * * * *